United States Patent
Severson et al.

(10) Patent No.: US 7,845,221 B2
(45) Date of Patent: Dec. 7, 2010

(54) DETECTING ICE PARTICLES

(75) Inventors: John Albert Severson, Eagan, MN (US); Darren Jackson, Savge, MN (US); Matthew J. Hansen, Savage, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 93 days.

(21) Appl. No.: 12/442,833

(22) PCT Filed: Sep. 24, 2007

(86) PCT No.: PCT/US2007/079328

§ 371 (c)(1), (2), (4) Date: Mar. 25, 2009

(87) PCT Pub. No.: WO2008/051673

PCT Pub. Date: May 2, 2008

(65) Prior Publication Data

US 2010/0206991 A1 Aug. 19, 2010

Related U.S. Application Data

(60) Provisional application No. 60/826,827, filed on Sep. 25, 2006.

(51) Int. Cl.
*G01W 1/00* (2006.01)
*B64D 15/20* (2006.01)
(52) U.S. Cl. ............. 73/170.02; 73/170.26; 244/134 F
(58) Field of Classification Search .............. None
See application file for complete search history.

(56) References Cited

U.S. PATENT DOCUMENTS

| | | |
|---|---|---|
| 3,976,270 A | 8/1976 | Catchpole |
| 3,996,787 A | 12/1976 | Edgington |
| 4,095,456 A | 6/1978 | Edgington |
| 4,732,351 A | 3/1988 | Bird |
| 5,301,905 A | 4/1994 | Blaha |
| 5,752,674 A | 5/1998 | Mears |
| 5,890,677 A | 4/1999 | Guillot |

(Continued)

FOREIGN PATENT DOCUMENTS

DE 701884 C 1/1941

(Continued)

OTHER PUBLICATIONS

Mason, J.G., et al., "The Ice Particle Threat to Engines in Flight," American Institute of Aeronautics and Astronautics, 44th AIAA Aerospace Sciences Meeting and Exhibit, Reno, Nevada, pp. 1-21 (Jan. 9-12, 2006).

(Continued)

*Primary Examiner*—Andre J Allen
(74) *Attorney, Agent, or Firm*—Womble Carlyle Sandridge & Rice, PLLC

(57) ABSTRACT

Systems and methods for detecting ice particle accumulation is disclosed herein. In one exemplary implementation, a method for detecting ice is described in which a parameter within an interior volume of a heated conduit is measured. The method also includes detecting the presence of an accumulation of ice particles based on the parameter measured within the interior volume of the heated conduit.

25 Claims, 4 Drawing Sheets

U.S. PATENT DOCUMENTS

| | | |
|---|---|---|
| 6,347,767 B1 | 2/2002 | Holmen |
| 6,560,551 B1 | 5/2003 | Severson |
| 6,759,962 B2 | 7/2004 | Severson |
| 7,014,357 B2 | 3/2006 | Severson |
| 7,104,502 B2 | 9/2006 | Otto |
| 7,175,136 B2 | 2/2007 | Shah |
| 2002/0158768 A1 | 10/2002 | Severson |
| 2004/0015303 A1 | 1/2004 | Severson |
| 2004/0024538 A1 | 2/2004 | Severson |
| 2004/0095984 A1 | 5/2004 | Severson |
| 2005/0218268 A1 | 10/2005 | Otto |
| 2005/0230553 A1 | 10/2005 | Otto |
| 2006/0133447 A1 | 6/2006 | Severson |
| 2007/0102573 A1* | 5/2007 | Goto ........................ 244/76 R |
| 2007/0102582 A1* | 5/2007 | Botura et al. ............ 244/134 D |

FOREIGN PATENT DOCUMENTS

| | | |
|---|---|---|
| GB | 1 406 957 A | 9/1975 |
| WO | 2008051673 A2 | 5/2008 |

OTHER PUBLICATIONS

PCT International Search Report and Written Opinion (PCT/US2007/079328, dated May 27, 2008).

* cited by examiner

DETECTING ICE PARTICLES

CROSS-REFERENCE TO RELATED APPLICATIONS

This application claims the benefit of U.S. Provisional Application No. 60/826,827, filed Sep. 25, 2006, the entire disclosure of which is incorporated by reference herein.

TECHNICAL FIELD

The present disclosure generally relates to detecting ice and more particularly relates to systems and methods for detecting and measuring the accumulation of ice particles when an aircraft is in flight.

BACKGROUND

Atmospheric conditions that are important to designers of airborne vehicles include liquid water content (LWC) and ice water content (IWC). While LWC has for some time been the focus of sources of hazardous ice due to the freezing of supercooled liquid water on aircraft surfaces, attention recently has been directed to the ice content of the atmosphere and potential hazardous accumulation of ice particles. These particles may be in the form of individual ice crystals, aggregates of crystals such as snowflakes, or crystals that have collided with supercooled water droplets to form more dense and spherical particles such as graupel and hail. The size of ice particles can vary significantly, from microns to centimeters. In the past, ice particles generally were not considered to be a hazard to the outside shell of an aircraft because they will typically bounce off the surface of the aircraft and not accumulate. Ice particles can nonetheless cause problems associated with an aircraft. For example, when ice particles are ingested into an aircraft's engines, ducts, or cavities, they can collect together and form a blockage that can be detrimental. Also, accumulated ice particles can melt and then refreeze within a downstream portion of the aircraft's systems, further causing problems to engines and/or air data instrumentation. To help assess these potential problems, the FAA has created an Ice Protection Harmonization Working Group that among other activities investigates engine events attributed to ice particle ingestion.

A need exists in the current state of the art to detect the accumulation of ice particles, and to detect ice particles that are present in sufficient concentration for a sufficient time period, since a substantial concentration of ice may have a hazardous impact on airborne vehicles.

SUMMARY

Generally, the present disclosure describes systems and methods for detecting ice particles. In one embodiment, among others, a system is described for detecting ice particles for use on an airborne vehicle. The system comprises a conduit having a longitudinal axis substantially parallel with a flow of air. The conduit includes an inlet at a fore portion thereof and an outlet at an aft portion thereof. The system also includes a sensor configured to detect when an accumulation of ice particles at least partially clogs the outlet of the conduit. Also, the sensor is further configured to provide an indication signal when an accumulation of ice particles is detected. The system also comprises a processing device in communication with the sensor and a heater configured to heat the conduit to a temperature that can melt the ice particles. The cross-sectional area of the inlet is larger than the cross-sectional area of the outlet, such that ice particles in the flow of air can accumulate at the outlet of the conduit.

In one of several implementations, a conduit used in an ice detecting device is disclosed herein. The conduit in this one embodiment comprises a hollow tube having a channel through which air is capable of flowing. The conduit also includes an inlet located at a first end of the hollow tube. The inlet is configured to allow air to enter the channel and has a first cross-sectional area. Also included in the conduit is an outlet located at a second end of the hollow tube. The outlet is configured to allow air to exit the channel and has a second cross-sectional area. The first cross-sectional area is greater than the second cross-sectional area such that an obstruction is formed within the channel when the concentration of ice particles in an airflow exceeds a threshold level.

The present application also includes implementations of methods for detecting ice particles. In one embodiment, a method of detecting ice in the vicinity of an airborne vehicle is disclosed. The method comprises heating a conduit at a selected power level and measuring a parameter within an interior volume of the conduit. The method also includes detecting the presence of an accumulation of ice particles based on the parameter measured within the interior volume of the conduit.

Also disclosed herein are embodiments of software program(s) for measuring ice accumulation. In one implementation, a program is stored on a computer-readable medium and comprises logic configured to receive a measurement of a parameter of an interior portion of a conduit. The conduit includes an inlet having a first cross-sectional area and an outlet having a second cross-sectional area. The first cross-sectional area is greater than the second cross-sectional area. The program also includes logic configured to process the parameter of the interior portion of the conduit to detect when ice particles obstruct the outlet of the conduit.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components in the following figures are not necessarily drawn to scale. Instead, emphasis is placed upon clearly illustrating the general principles of the present disclosure. Reference characters designating corresponding components are repeated as necessary throughout the figures for the sake of consistency and clarity.

DETAILED DESCRIPTION

When an aircraft is in flight, ice particles can build or gather on or in various components and systems of the aircraft. This collection or formation of ice is undesirable and can obstruct or restrict airflow and impede the operation of the components and systems. Taking advantage of this tendency of ice to accumulate, the present disclosure describes systems and methods for providing a warning or indication when ice particle accumulation reaches a level that can negatively affect the operation of the aircraft components and systems. In response to a warning of excess levels of ice, corrective actions could then be taken to reduce or even avoid disruption. The warnings or indications can be provided to the crew of the aircraft to prompt the crew to take action or they can be provided to external devices, such as deicing devices, which can be configured to automatically take action in response to the warnings.

Figure 1:
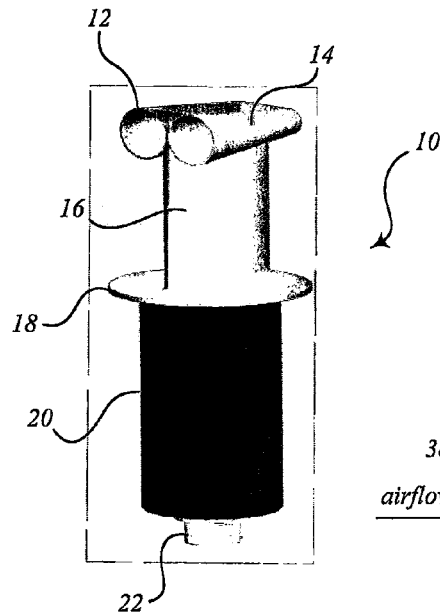
FIG. 1 is a diagram illustrating an oblique view of an ice detection device according to one embodiment.

FIG. 1 illustrates an exemplary embodiment of an ice detection device 10. The ice detection device 10 includes a first converging conduit 12, a second converging conduit 14, a strut 16, a base 18, a housing 20, and a connector 22. The ice detection device 10 can be mounted on an aircraft (not shown) for detecting ice particles in the airflow when the aircraft is in flight. In some embodiments, the first converging conduit 12 and second converging conduit 14 are substantially equal in size and geometry. Also, the first and second converging conduits 12, 14 may be positioned near each other or in locations that may experience similar airflow patterns. In addition, the first and second converging conduits 12, 14 may be oriented in substantially the same direction, or at least in similar directions with respect to airflow. As illustrated, the first and second converging conduits 12, 14 are positioned at approximately the same height above the base 18. It should be noted, however, that the two converging conduits 12, 14 may have any relative position suitable to experience similar airflow patterns with respect to the aircraft. When designed with the proper dimensions and installed with the proper orientation, the converging conduits 12, 14 can, by design, purposely accumulate ice particles. Also, aerodynamic forces can keep the accumulation in contact with the inner walls of the converging conduits 12, 14.

The base 18 can include holes around its perimeter that allow the ice detection device 10 to be attached to the outer shell of the aircraft. In this case, the ice detection device 10 may be attached to the aircraft using nuts, bolts, rivets, etc., or, in other embodiments, may be attached to the aircraft using any other suitable attachment components. The base 18 also serves to keep the ice detection device 10 in a fixed position with respect to the aircraft. The ice detection device 10 may be attached to the fuselage, wing, tail, engine inlet, or other part of the aircraft. The mounting location of the ice detection device 10 may be based on the aerodynamics, temperature characteristics, vibration characteristics, and the availability of additional air data measurements made by external devices.

The housing 20 may house a number of electronic components, as described in more detail below, which can be configured to detect measurable parameters, process signals, and control components in a feedback manner. In other embodiments, these electronic components may be positioned outside the housing 20 in portions of the structure of the ice detection device 10 above the base 18 or at remote locations within the interior portions of the aircraft. The connector 22 includes any suitable adapting structure, pins, terminals, etc., for electrically communicating (either via wires or wireless transmission) detection signals, warning signals, alarm signals, etc., to other devices, e.g., deicing devices.

Figure 2:
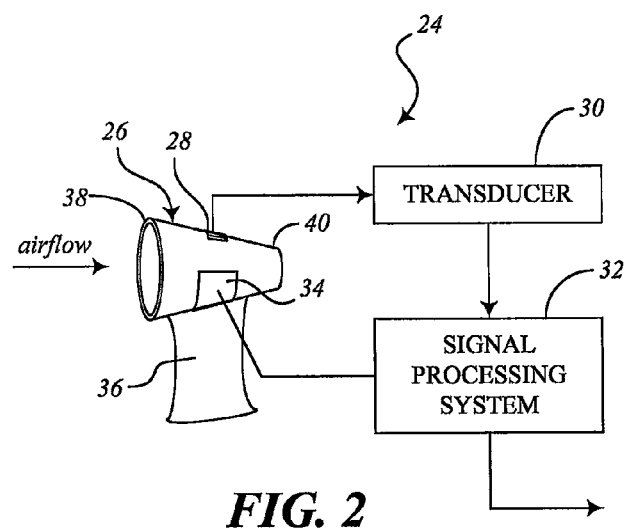
FIG. 2 is a schematic diagram of a first embodiment of an ice detection system.

FIG. 2 is a diagram showing a first embodiment of an ice detection system 24. The ice detection system 24 includes a conduit 26, a sensing element 28, a transducer 30, a signal processing system 32, and a heating element 34. The conduit 26 is supported on an aircraft (not shown) by a strut 36, having any suitable size and shape. The strut 36 holds the conduit 26 in a steady position such that a longitudinal axis of the conduit 26 is substantially aligned with the flow of air with respect to the aircraft as it is in flight. Depending on the airflow characteristics around various portions of the aircraft, the conduit 26 may be aligned in any suitable direction such that air flows into an interior portion of the conduit 26. In some embodiments, the longitudinal axis of the conduit 26 is substantially aligned with the direction in which the aircraft is moving, that is, when the conduit 26 is positioned near a portion of a surface of the aircraft where airflow over that portion is substantially aligned with the aircraft flight direction. The strut 36 may be heated electrically or by other means to allow it to operate ice-free in flight.

The conduit 26 includes a fore portion 38 where air enters the conduit and an aft portion 40 where air exits the conduit. The cross-sectional area of the fore portion 38 can be larger than the cross-sectional area of the aft portion 40, such that, in a sense, the conduit 26 funnels the air flowing therethrough. While conduit 26 is shown in FIG. 2 as a truncated cone, this invention is not limited thereby. When the air includes a certain concentration of ice particles, the ice particles may accumulate in the aft portion 40 of the conduit 26 and create a clog or blockage. When this happens, an increase occurs in the static air pressure at points along the interior wall of the conduit 26, hereafter referred to as "wall pressure." Also, other parameters within the interior of the conduit 26 may change as well. The sensing element 28 senses the changes in the parameters of the interior of the conduit 26 due to the ice particle obstruction or blockage.

The sensing element 28 provides the sensed or measured parameter to the transducer 30, which converts the sensed parameter into a corresponding electrical signal. In some embodiments, the sensing element 28 and transducer 30 may be combined to form a unitary sensing device for sensing a particular parameter. The transducer 30 may include a filter circuit to suppress noise and/or electromagnetic interference. The transducer 30 may also include other electrical circuits, such as analog-to-digital converters, etc. After converting the sensed parameter into an electrical signal, the transducer 30 provides this signal to the signal processing system 32.

The signal processing system 32 may include, for example, a microprocessor or microcontroller, memory components, etc. The memory components may include internally fixed storage and/or removable storage media. The storage within the memory components may include volatile and/or non-volatile memory and can store a software program in read only memory (ROM) that includes logic for measuring or detecting the concentration of ice particles in an airflow. The microprocessor of the signal processing system 32 can execute the software to perform related functions for measuring the ice concentration. Logic may be included that regulates the application of power to the heating element 34 for increasing or decreasing the temperature of the heating element 34 and, in turn, the temperature of the conduit 26. Logic may also be included that processes measured parameters of the interior of the conduit 26 and stores changes of the parameters over time. Logic may also be included that communicates with external devices for controlling a remote display screen or indicating parameters or conditions to aircraft avionics. When the signal processing system 32 detects that ice accumulation is severe enough to disrupt operation of aircraft components and systems, the signal processing system 32 provides an advanced warning so that corrective action can be taken.

The signal processing system 32 can be configured to receive other parameters or characteristics of ambient air, gathered, for instance, by an external device. These other parameters may include, for example, total temperature, total pressure, static pressure, airspeed, altitude, humidity, etc. These parameters could be used to calculate variations in convective heat removal and ambient temperature influences on the conduit 26 such that heating power could be adjusted to ensure that an ice clog might accumulate at a certain ice particle concentration level.

The signal processing system 32 may also include a low power supply device for applying power to its internal circuitry plus a high power supply device for applying power to the heating element 34. For example, the power applied to the heating element 34 may be on the order of up to about 300 watts. The signal processing system 32 can adjust the amount of power to control the rate at which accumulated ice melts.

In general, heating power would be decreased with increasing air temperature and/or decreasing mass air flow over the sensing element 28. The amount of power adjustment could be defined by an algorithm or look-up table stored in memory of the signal processing system 32. The algorithm or look-up table could be defined by calibration of the sensing element 28 at a number of conditions where various air data information, such as temperature, pressure, air flow, etc., is known. Such calibration, for instance, could be performed in a wind tunnel.

Although the heating element 34 is shown in FIG. 2 as covering only a small section of the conduit 26, it should be understood that the heating element 34 may be designed to partially or completely surround the conduit. Also, the heating element 34 can be positioned outside the conduit 26, embedded within the wall material of the conduit 26, or positioned adjacent to an interior surface of the conduit 26. The heating element 34 is heated to a temperature to prevent supercooled liquid water from freezing. When heated to a higher temperature, the heating element 34 slows down the rate at which ice particles can accumulate within the conduit 26. An ice accumulation is typically maintained as long as ice particles enter the conduit 26 at a greater rate than the heating element 34 can melt the ice.

To prevent freezing of supercooled liquid water in the most severe temperature conditions, the heating element 34 will need to heat the supercooled liquid water, possibly as high as a 40° C. temperature differential. The energy needed to heat a mass of ice by a certain temperature differential is greater than the energy needed to heat the same mass of supercooled liquid water by the same temperature differential. For example, the heat of fusion of ice is about two times greater than would be required to warm the same mass of supercooled water from an initial temperature to a final temperature that is slightly more than 40° C. higher than the initial temperature. Furthermore, atmospheric ice mass content usually considered harmful exceeds water mass content by several times. For reference, one to two grams of water per cubic meter of air is usually considered to be a high liquid water content whereas five to eight grams of ice particles per cubic meter is usually considered to be a high ice content. This illustrates that it will take significantly more energy to melt an ice clog relative to the amount of energy to keep the conduit 26 operating ice-free in a supercooled liquid water environment. The controlled heating of the surfaces of the conduit 26 can keep the conduit ice-free in LWC conditions and ice-free when the IWC concentration is below a certain threshold. However, as designed, the conduit 26 can clog when a certain concentration of ice particles exceeding the threshold is experienced. Often aircraft are equipped with ice detectors substantially sensitive to LWC only. Icing rate information from one of these detectors could be used to discriminate a very high LWC condition from a relatively low IWC condition if it were desired to extend the range of the ice crystal detector to a lower detection threshold than would otherwise be possible.

Figure 3:
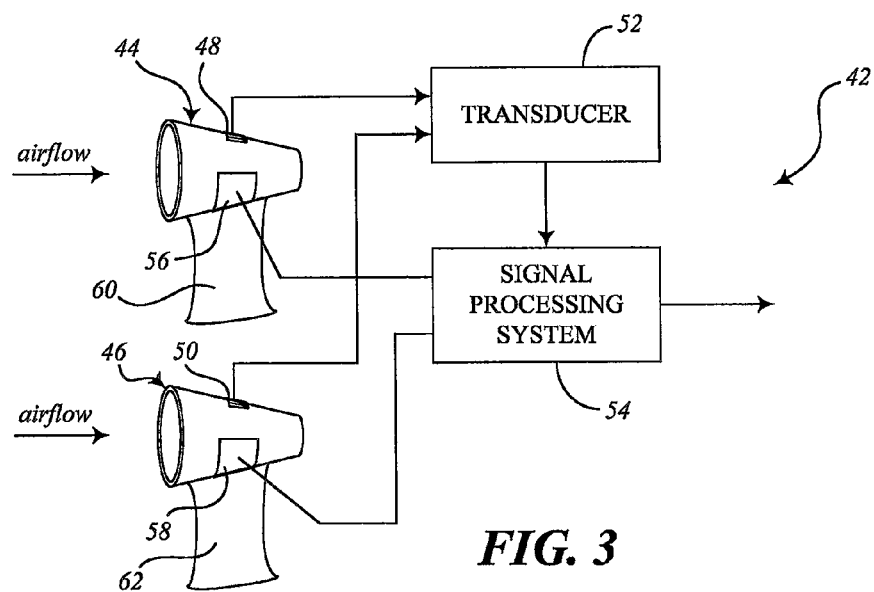
FIG. 3 is a schematic diagram of a second embodiment of an ice detection system.

FIG. 3 is a schematic diagram of a second embodiment of an ice detection system 42. In this embodiment, the ice detection system 42 includes two conduits 44 and 46, two respective sensing elements 48 and 50, a transducer 52, a signal processing system 54, and two respective heating elements 56 and 58. The conduits 44, 46 are supported by struts 60 and 62, respectively, which are connected to an aircraft. In some embodiments, the conduits 44, 46 are supported by a single strut, similar to the implementation illustrated in FIG. 1. The components of the ice detection system 42 are similar in function to the corresponding components described with respect to FIG. 2. However, instead of one conduit in which an ice accumulation can be detected, the ice detection system 42 of FIG. 3 includes two conduits 44, 46. Also, the heating elements 56, 58 can be heated to different temperatures. In this respect, the replenishment rate and melting rate of collected ice within the conduits 44, 46 differs from one conduit to the other based on the differences in temperature, assuming all other factors are the same.

The ice detection system 42 can detect transitional changes in the parameters of the conduits 44, 46 with respect to each other. For example, when both conduits are not clogged and air can flow freely through the conduits, the wall pressure within the interior of the conduit 44 is approximately the same as that of conduit 46. When a conduit heated to a lower temperature forms an ice obstruction that restricts the flow of air, the pressure inside this conduit increases. The difference in pressure from the clogged conduit to the unclogged conduit can be detected as a first transition. At a later time, another transition may occur such that the obstruction in the one conduit is cleared by melting. Yet another transition may be represented by the initially unclogged conduit forming a clog such that both conduits would be clogged. In the two latter cases, the pressure difference between the interiors of the conduits will return to about zero. The signal processing system 54 may utilize logic to determine which event has occurred by tracking the pressure history of the two conduits or by taking other air data information into account.

The signal processing system 54 can adjust or maintain the temperature of each heating elements 56, 58 as needed to create an accumulation and melting cycle that can be easily measured. By comparing these cycles of each conduit 44, 46 at different temperatures, the signal processing system 54 can detect ice concentrations that are severe enough to disrupt operation of other components or systems of the aircraft. The signal processing system 54 also includes a clock or timing device to measure the duration that each conduit 44, 46 is clogged or to measure the time difference from the clogging of one conduit to the clogging of the other.

In one example, conduit 44 is heated to a first temperature and conduit 46 is heated to a second temperature that is higher than the first temperature. The second temperature may, in some embodiments, be high enough such that conduit 46 rarely or never clogs. Or, the second temperature may be adjusted such that ice accumulation might be likely to occur in conduit 46, but after a time from which conduit 44 clogs.

The signal processing system 32, 54 of the present disclosure can be implemented in hardware, software, firmware, or a combination thereof. When implemented in software or firmware, an ice detection software program of the signal processing system 32, 54 can be stored in memory and executed by a processing device. When implemented in hardware, the ice detection software program can be implemented, for example, using discrete logic circuitry, an application specific integrated circuit (ASIC), a programmable gate array (PGA), a field programmable gate array (FPGA), etc., or any combination thereof.

The programs or software code that include executable logical instructions, as described herein, can be embodied in any suitable computer-readable medium for execution by any suitable processing device. The computer-readable medium can include any physical medium that can store the programs or software code for a measurable length of time.

Figure 4A:
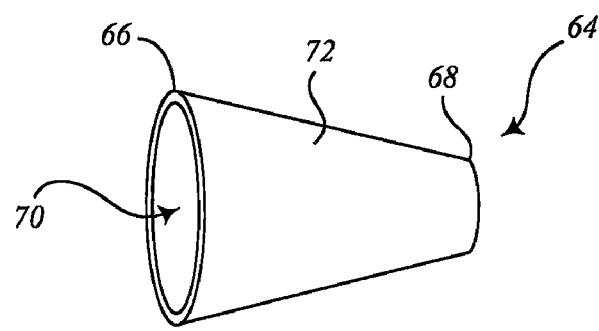
FIGS. 4A-4C illustrate exemplary embodiments of a conduit, such as one of the conduits shown in FIGS. 2 and 3.
Figure 4B:
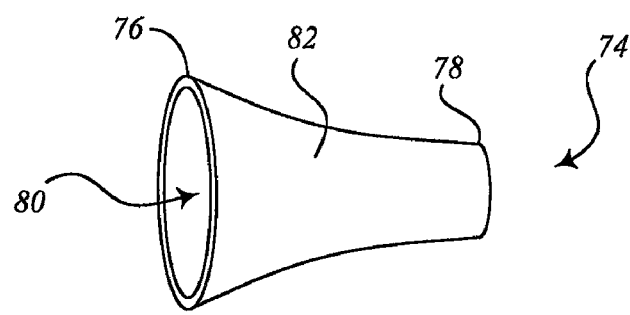
Figure 4C:
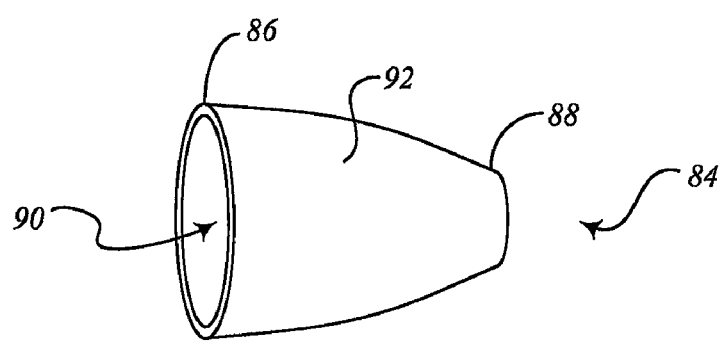

FIGS. 4A-4C illustrate three embodiments, among other possible embodiments, of conduits having different structural features. The conduits described with respect to the embodiments of FIGS. 2 and 3 may have the structure as shown in these figures or may include any other suitable structure that may tend to enhance the accumulation of ice particles. The conduits of FIGS. 4A-4C may include any material or combination of materials that may be suitable for sufficient strength, durability, and temperature fluctuation that is experienced by an aircraft. In some embodiments, the conduits of FIGS. 4A-4C may include an additional cylindrical extension (not shown) at the outlet of the conduit to reduce the effect of eddy currents at the aft portions of the conduits.

The cross-sectional area at the fore entrance to the conduits can be defined by $A_f$ and the cross-sectional area at the aft exit from the conduits can be defined by $A_a$. For example, the ratio $A_f:A_a$ can range from about 2:1 to about 20:1; however, the conduits can be formed such that the ratio $A_f:A_a$ is outside this range. Also, the conduits can have any suitable length L and any suitable $L:A_f$ ratio. The cross-sectional geometry of openings at the fore and aft portions of the conduits, as well as the cross-sectional geometry of the converging walls of the conduit, may be circular, elliptical, square, or any other suitable shape. The rims or edges of the conduits at the fore and aft portions may be formed in a plane that is perpendicular to a longitudinal axis of the conduit. However, in other embodiments, the edges can be non-planar or can be planar but non-perpendicular to the longitudinal axis of the conduit.

FIG. 4A shows a first embodiment of a conduit 64. In this embodiment, the conduit 64 includes a fore portion 66 and an aft portion 68. The conduit 64 has an interior portion 70 that has openings fore and aft. The walls 72 of the conduit 64 converge from the fore portion 66 to the aft portion 68 at a constant angle. In this respect, the conduit 64 may have the form of a truncated cone or frustum.

FIG. 4B shows a second embodiment of a conduit 74. In this embodiment, the conduit 74 includes a fore portion 76 and an aft portion 78. The conduit 74 has an interior portion 80 that has openings fore and aft. The walls 82 of the conduit 74 converge from the fore portion 76 to the aft portion 78 non-linearly, giving the conduit 74 a horn shape.

FIG. 4C shows a second embodiment of a conduit 84. In this embodiment, the conduit 84 includes a fore portion 86 and an aft portion 88. The conduit 84 has an interior portion 90 that has openings fore and aft. The walls 92 of the conduit 84 converge from the fore portion 86 to the aft portion 88 non-linearly, giving the conduit 74 the shape as shown, which can be compared to a shape of a bottomless bowl or vase.

Figure 5:
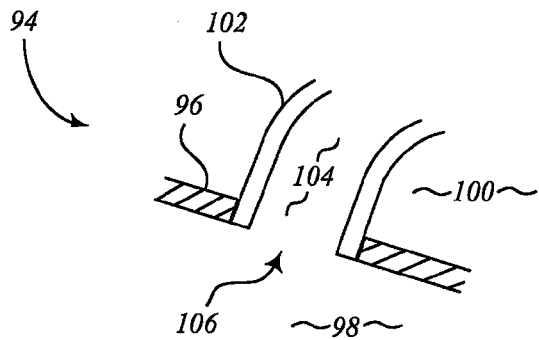
FIG. 5 is a diagram of a first embodiment of a sensing element, such as one of the sensing elements shown in FIGS. 2 and 3.

FIG. 5 illustrates a first embodiment of a sensing element 94 formed integrally with a conduit. The sensing element 94, for example, may be incorporated into the embodiments of FIGS. 2 and 3. In this embodiment, the sensing element 94 includes a wall portion 96 of a conduit, such as conduit 26, 44, or 46 shown in FIGS. 2 and 3. The wall portion 96 may have any shape, e.g., as defined in FIGS. 4A-4C, and defines an interior 98 and exterior 100 of the conduit. The sensing element 94 also includes a tube 102 having a channel 104, which is open to the interior 98 of the conduit at an opening or tap 106 in the conduit. The tube 102 may be connected to the wall portion 96 at any desirable location along the conduit using any suitable attachment structure or mechanism. In this embodiment, the wall pressure within the interior 98 of the conduit and channel 104 of the tube 102 can be in fluid communication with transducer 30, 52, thereby allowing the detection of the wall pressure of the interior 98.

In some embodiments, the transducer 30 shown in FIG. 2 can be a differential pressure sensor that senses the wall pressure in the interior of the conduit 26 via the tap 106 (FIG. 5) and a reference pressure. The reference pressure is indicative of a pressure to be expected when the conduit does not have an ice formation at its aft portion restricting the flow of air therethrough. The transducer 30, in this respect, senses the difference in pressures, if any, and applies a differential pressure signal to the signal processing system 32.

Furthermore, the sensing element 94 with the tap 106 can be used as the sensing elements 48 and 50 shown in FIG. 3. In this respect, the transducer 52 may be a differential pressure sensor that senses the wall pressures from the interiors of the conduits 44 and 46. In this embodiment, the heating element 58 of conduit 46, which may be considered as a reference conduit, heats the conduit 46 to such an extent that accumulation of ice is minimized. Hence, the sensing element 50 senses a normal pressure for an unclogged conduit. When conduit 44 is clogged with a collection of ice, the pressure in the interior of this conduit 44 increases. A differential pressure sensed by the transducer 52 can then be measured.

Figure 6:
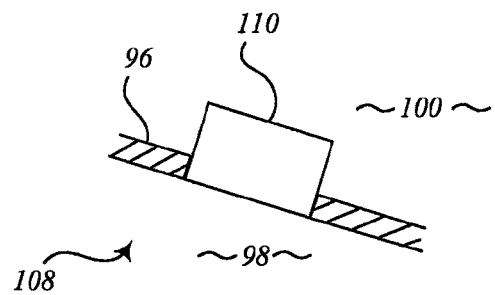
FIG. 6 is a diagram of a second embodiment of a sensing element, such as one of the sensing elements shown in FIGS. 2 and 3.

FIG. 6 is a diagram of a second embodiment of a sensing element 108, which can be used in place of the sensing elements 28, 48, and/or 50 shown in FIGS. 2 and 3. The sensing element 108 includes the wall portion 96 of a conduit separating its interior 98 from its exterior 100. The sensing element 108 also includes a pressure sensor 110 positioned within the wall portion 96 such that it is exposed to the interior 98 of the conduit. The pressure sensor 110 may include any suitable size, structure, or pressure sensing components as are known in the art for measuring the wall pressure in the interior 98 of the conduit.

Figure 7:
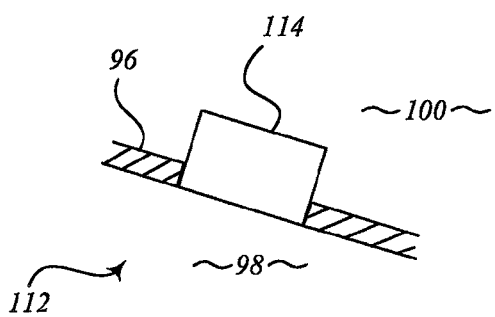
FIG. 7 is a diagram of a third embodiment of a sensing element, such as one of the sensing elements shown in FIGS. 2 and 3.

FIG. 7 is a diagram of a sensing element 112 according to a third embodiment, in which the sensing element 112 can be used in place of the sensing elements 28, 48, and/or 50 shown in FIGS. 2 and 3. The sensing element 112 includes the wall portion 96 of a conduit separating its interior 98 from its exterior 100. The sensing element 112 also includes a temperature sensor 114 positioned within the wall portion 96 such that it is exposed to the interior 98 of the conduit. The temperature sensor 114 may include any suitable size, structure, or temperature sensing components as are known in the art for measuring the temperature in the interior 98 of the conduit.

Figure 8:
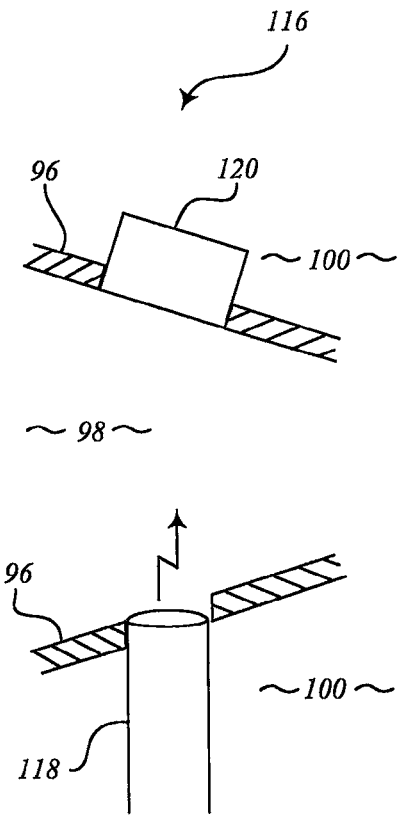
FIG. 8 is a diagram of a fourth embodiment of a sensing element, such as one of the sensing elements shown in FIGS. 2 and 3.

FIG. 8 is a diagram illustrating a sensing element 116 according to a fourth embodiment. The sensing elements 28, 48, and/or 50 shown in FIGS. 2 and 3 may be replaced by the sensing element 116. In this embodiment, the sensing element 116 includes opposing wall portions 96 of a conduit separating its interior 98 from its exterior 100. The sensing element 116 also includes a light source 118 as is known in the art positioned to be able to radiate a beam of light across the interior 98 of the conduit. Responsive to the light beam is a photoreceptive device 120 as is known in the art capable of detecting the light beam from the light source 118. When ice gathers in the conduit to such an extent that the ice mass obstructs the light beam, then the photoreceptive device 120 is unable to receive the light beam and can send a signal indicating an ice blockage condition. When the ice does not accumulate to such an extent or the ice is subsequently melted to clear the blockage, then the photoreceptive device 120 can again detect the light beam to determine that the blockage is no longer present.

Figure 9:
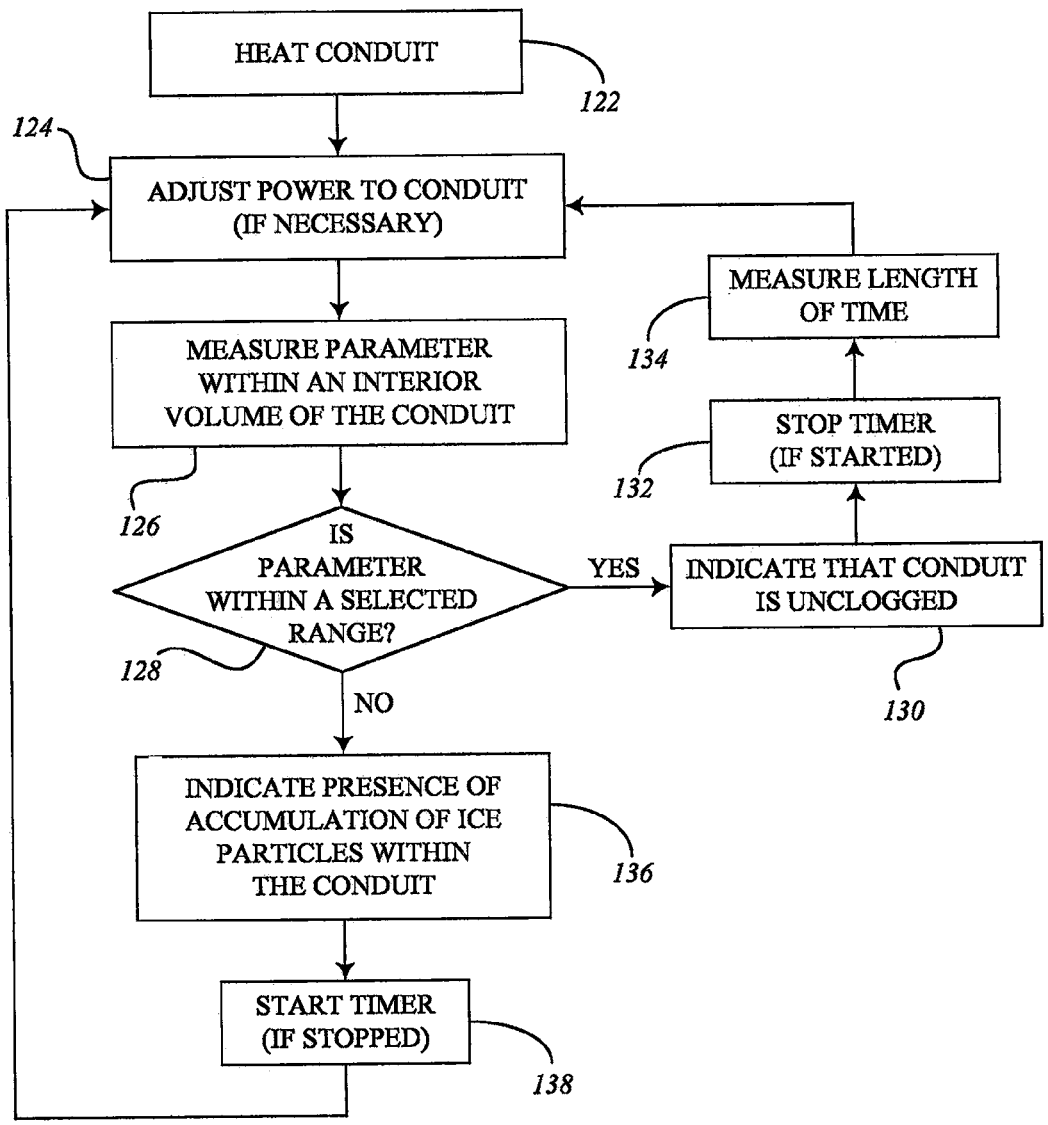
FIG. 9 illustrates a flow chart for detecting ice particles according to one embodiment.

FIG. 9 is a flow chart illustrating a process for detecting ice particles according to an embodiment of this invention. The flow chart includes heating a conduit, as indicated in block 122. In block 124, the heating power supplied to the conduit is adjusted, if necessary, to melt accumulated ice that is below a threshold of, for example, IWC. The power also may be adjusted in order to compensate for various air characteristics or to adjust the sensitivity of the conduit for more clearly defining an ice accumulation condition. This adjustment or "tuning" prevents ice from accumulating until certain conditions are present or until a certain threshold of IWC, for example, is detected in the atmosphere.

In block 126, parameters can be measured within the interior volume of the conduit. These parameters may include, for example, pressure, temperature, light obstruction, or other various parameters that may be indicative of an ice accumulation condition. In decision block 128, it can be determined whether or not the measured parameter is within a selected range. A selected range may refer to a condition in which the conduit is not clogged or includes no substantial accumulation of ice, allowing air to freely flow therethrough. When it is determined in block 128 that the parameter is within the selected range, the process flow is directed to block 130, in which an indication is presented that the conduit is unclogged. In block 132, a timer is stopped, if this timer was indeed started in a prior operation. In block 134, a length of time is measured from the starting of the timer to the stopping of the timer. The process flow is then fed back to block 124 to repeatedly measure the parameter until it is out of the selected range, which can mean that above-threshold ice is present.

When it is determined in block 128 that the parameter is not within the selected range, the process flow is directed to block 136. In block 136, an indication is provided that an accumulation of ice particles is present within the conduit. In block 138, the timer is started, if it was indeed stopped, the starting of the timer marking the beginning of the time period during which the conduit was clogged. From block 138, the process may then flow back to block 124. The flow chart may be configured to continue to loop in this manner to repeat the ice detection operations, or alternatively may discontinue as desired. Additionally, total water content (TWC) could be estimated by adding IWC as determined herein to LWC as determined from an icing condition detector.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein merely represent exemplary implementations and are not intended to necessarily limit the present disclosure to any specific examples. Instead, various modifications can be made to these embodiments as would be understood by one of ordinary skill in the art. Any such modifications are intended to be included within the spirit and scope of the present disclosure and protected by the following claims.

We claim:

1. An ice particle detection system, for use on an airborne vehicle, comprising:
   a conduit having a longitudinal axis substantially parallel with a flow of air, the conduit including an inlet at a fore portion thereof and an outlet at an aft portion thereof;
   a sensor configured to detect when an accumulation of ice particles at least partially clogs the outlet of the conduit and further configured to provide an indication signal when an accumulation of ice particles is detected;
   a processing device in communication with the sensor; and
   a heater configured to heat the conduit to a temperature that can melt the ice particles;
   wherein the cross-sectional area of the inlet is larger than the cross-sectional area of the outlet, such that ice particles in the flow of air can accumulate at the outlet of the conduit.

2. The system of claim 1, wherein the sensor comprises a sensing element and a transducer.

3. The system of claim 2, wherein the sensing element comprises a pressure tap in a wall of the conduit to sense the pressure within the interior of the conduit.

4. The system of claim 3, wherein the transducer comprises a differential pressure sensor configured to sense the pressure within the interior of the conduit with respect to a reference pressure.

5. The system of claim 4, wherein the conduit is a first conduit, the system further comprising a second conduit, the second conduit comprising a second tap configured to provide the reference pressure.

6. The system of claim 5, wherein the heater is a first heater configured to heat the first conduit to a first temperature, the system further comprising a second heater configured to heat the second conduit to a second temperature, wherein the first and second temperatures are associated with a threshold level, whereby a concentration of ice particles above the threshold level results in the accumulation of a blockage of the first conduit and a concentration of ice particles below the threshold level results in the melting of the ice particles to keep the second conduit substantially ice free.

7. The system of claim 6, wherein the processing device is further configured to adjust the heating outputs of the first and second heaters.

8. The system of claim 1, wherein the sensor comprises a pressure sensor supported within a wall of the conduit, the pressure sensor configured to sense the pressure within the interior of the conduit, the processing device further configured to detect an increase in the pressure within the interior of the conduit, the increase being indicative of an accumulation of ice particles in the conduit.

9. The system of claim 1, wherein the sensor comprises a temperature sensor supported within a wall of the conduit for measuring the temperature of the interior of the conduit, the processing device further configured to detect a change of temperature within the interior of the conduit when an accumulation of ice particles forms in the conduit.

10. The system of claim 1, wherein the sensor comprises a light source and an optical receptive device, the light source configured to radiate a light beam through a portion of the interior of the conduit toward the optical receptive device, and wherein the optical receptive device is configured to detect when the light beam is blocked.

11. The system of claim 1, wherein the processing device transmits a warning signal to an external device to indicate an ice clog condition.

12. The system of claim 1, wherein the conduit has a shape selected from the group of shapes consisting of a truncated cone, a horn, and a bottomless bowl.

13. A conduit used in an ice detecting device, the conduit comprising:
- a hollow tube having a channel through which air is capable of flowing;
- an inlet located at a first end of the hollow tube, the inlet configured to allow air to enter the channel, the inlet having a first cross-sectional area; and
- an outlet located at a second end of the hollow tube, the outlet configured to allow air to exit the channel, the outlet having a second cross-sectional area;
- wherein the first cross-sectional area is greater than the second cross-sectional area such that an obstruction is formed within the channel when the concentration of ice particles in an airflow exceeds a threshold level.

14. The conduit of claim 13, further comprising a strut, for attachment on the aircraft, wherein air flows through the hollow tube when the aircraft is in flight.

15. The conduit of claim 13, wherein the hollow tube has a frustoconical shape.

16. The conduit of claim 13, wherein the diameter of the tube decreases non-linearly from the inlet to the outlet.

17. The conduit of claim 13, further comprising a heating device configured to heat the tube.

18. A method of detecting ice in the vicinity of an airborne vehicle, the method comprising:
- heating a conduit at a selected power level;
- measuring a parameter within an interior volume of the conduit; and
- detecting the presence of an accumulation of ice particles based on the parameter measured within the interior volume of the conduit.

19. The method of claim 18, further comprising:
- detecting an absence of said accumulation of ice particles when the ice particles are melted by the heating of the conduit; and
- measuring a length of time from detecting a start of the accumulation of ice particles to detecting a subsequent absence of the accumulation of ice particles.

20. The method of claim 19, further comprising:
- measuring conditions of air outside the conduit, the conditions of air outside the conduit including at least one of total pressure, static pressure, total temperature, and static temperature; and
- adjusting the heating of the conduit based on the measured conditions of air outside the conduit.

21. The method of claim 18, wherein the parameter is selected from the group of parameters consisting of pressure, temperature, and light beam obstruction.

22. The method of claim 18, wherein the conduit is a converging conduit.

23. A program stored on a computer-readable medium, the program comprising:
- logic configured to receive a measurement of a parameter of an interior portion of a conduit, wherein the conduit includes an inlet having a first cross-sectional area and an outlet having a second cross-sectional area, and the first cross-sectional area is greater than the second cross-sectional area; and
- logic configured to process the parameter of the interior portion of the conduit to detect when ice particles obstruct the outlet of the conduit.

24. The program of claim 23, further comprising logic configured to control a heating output of a heater adapted to heat the conduit.

25. The program of claim 23, further comprising logic configured to generate a signal indicating the presence of an ice particle obstruction at the outlet of the conduit.

* * * * *